US006456272B1

(12) United States Patent
Howard et al.

(10) Patent No.: US 6,456,272 B1
(45) Date of Patent: *Sep. 24, 2002

(54) FIELD ADDRESSED DISPLAYS USING CHARGE DISCHARGING IN CONJUNCTION WITH CHARGE RETAINING ISLAND STRUCTURES

(75) Inventors: Matthew E. Howard, San Francisco; Edward A. Richley, Palo Alto, both of CA (US)

(73) Assignee: Xerox Corporation, Stamford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/438,894

(22) Filed: Nov. 12, 1999

(51) Int. Cl.$^7$ .................................................. G09G 3/34
(52) U.S. Cl. ........................... 345/107; 345/84; 345/85; 345/86; 345/108; 345/109
(58) Field of Search ............................. 345/107, 84, 85, 345/86, 48, 108, 109

(56) References Cited

PUBLICATIONS

U.S. Application No. 09/037,767, titled Charge Retention Islands for Electric Reusable Paper and Applications Thereof, filed Mar. 10, 1998.

U.S. Application No. 09/275,880, titled Tribo–Addressed and Tribo–Surpressed Electric Paper, filed Mar. 25, 1999.

Howard et al., Gyricon Electric Paper, Proceedings of the SID, May 1998, no page numbers listed.

Primary Examiner—Richard Hjerpe
Assistant Examiner—Ali Zamani
(74) Attorney, Agent, or Firm—Nola Mae McBain (57) ABSTRACT

The invention is an electric reusable paper sheet that uses a pattern of conductive charge-retaining islands on the outward-facing side of the first of two thin layers used to encapsulate a Electric reusable paper substrate which interact with conductive areas in the encapsulating sheet. The second encapsulating layer may also coated with a conductive material, or made of a conductive material, and may or may not be patterned. The Electric reusable paper substrate and two encapsulating layers comprise a sheet of Gyricon electric reusable paper on which images can be written and erased repeatedly. The patterned charge-retaining islands of the first encapsulating layer receive electric charges from an external charge-transfer device. After the charge-transfer device is removed, the conductive, charge-retaining islands hold electric charge, creating an electric field in the electric reusable paper sufficient to cause an image change.

40 Claims, 7 Drawing Sheets

FIELD ADDRESSED DISPLAYS USING CHARGE DISCHARGING IN CONJUNCTION WITH CHARGE RETAINING ISLAND STRUCTURES

RELATED TO

This application is related to U.S. patent application Ser. No. 09/037,767, titled "Charge Retention Islands For Electric Reusable Paper And Applications Thereof", by Howard et al. and filed on Mar. 10, 1998.

INCORPORATION BY REFERENCE

The following patents and/or patent applications are herein incorporated by reference:

U.S. patent application Ser. No. 09/037,767, titled "Charge Retention Islands For Electric Reusable Paper And Applications Thereof", by Howard et al. and filed on Mar. 10, 1998, U.S. patent application Ser. No. 08/716,672 titled "Twisting Cylinder Display" by Crowley and Sheridon, and filed Sep. 13, 1996, and U.S. Pat. No. 5,894,367 titled "Twisting Cylinder Display Using Multiple Chromatic Values" by Sheridon, and issued Apr. 13, 1999.

BACKGROUND

This invention relates to the use of electronic display materials for electric reusable paper applications. The invention is designed for use with Gyricon electric reusable paper but may also be used with electric reusable paper based on liquid crystal, electrophoretic, and other field-effect display technologies.

Electric reusable paper can be defined as any electronically-addressable display medium that approximates paper in form and function. Electric reusable paper should be light-weight, thin, and flexible, and it should display images indefinitely while consuming little or no power. In addition, electric reusable paper should be re-usable. One must be able to erase images and create new ones repeatedly. Preferably, electric reusable paper should display images using reflected light and allow a very wide-viewing angle.

One way to make electric reusable paper possible using traditional electronic display technology is to completely remove the driving electronics from an electronic display package and use external addressing electrodes to write and erase images. This approach both reduces the per unit cost of electronic paper sheets and enables the use of cheap, flexible plastic films in place of glass plates for packaging. Multiple electronic paper sheets can then be addressed by a single set of external driving electronics, much like multiple sheets of pulp paper are printed on by a single printer.

A sheet and display system dubbed Gyricon is disclosed in various patents and articles, such as U.S. Pat. No. 4,126,854 by Sheridon titled "Twisting Ball Display". The Gyricon display system is comprised of a host layer a few mils thick which is heavily loaded with bichromal elements, possibly spheres, tens of microns in diameter. Each bichromal element has halves of contrasting colors, such as a white half and a black half. Each bichromal element also possesses an electric dipole, orthogonal to the plane that divides the two colored halves. Each bichromal element is contained in its own cavity filled with a dielectric liquid. Upon application of an electric field between electrodes located on opposite surfaces of the host layer, the bichromal elements will rotate depending on the polarity of the field, presenting one or the other colored half to an observer.

An Electric reusable paper substrate has many of the requisite characteristics of electric reusable paper, namely, bistable image retention, wide viewing angle, thin and flexible packaging, and high reflectance and resolution. U.S. Pat. No. 5,389,945 issued to Sheridon on Feb. 14, 1995, and titled "Writing System Including Paper-Like Digitally Addressed Media And Addressing Device Therefor", describes an electric reusable paper printing system that employs independent, external addressing means to put images on the Electric reusable paper substrates. The external addressing means is described as a one-dimensional array of electrodes connected, either directly or by wireless technology, to modulating electronics. As the one-dimensional array is scanned across the sheet, modulating electronics adjust the potential at the individual electrodes, creating electric fields between the electrodes and an equipotential surface. An image is created in the sheet according to the polarity of the electric fields. However, fringing fields in the vicinity of the addressing electrodes can cause incomplete or excessive rotation of the imaging elements in the sheet. Optical properties of improperly rotated imaging elements are not optimal because of their over-rotated orientations.

A second issue is the return-to-zero effect, that limits the ability to address Electric reusable paper substrates with external addressing. Positive and negative mobile ionic charges are present in the sheet as well. In regions of the sheet trailing the path of the external addressing device, and no longer under the influence of an applied external electric field, mobile ionic space charges create an electric field opposite to the previously applied field which imparts torque on the bichromal elements contained therein. This torque can dislodge the bichromal element 220 from its intended position, determined by the external addressing device, leaving it in an optically-poor position for viewing.

A third issue facing electric reusable paper printing systems is that sheets, once printed on by some external addressing device, are subject to inadvertent tribo-electric writing. In the described electric reusable paper printing system, images are produced willfully by an external addressing device that has the ability to create electric fields. Electric charge applied inadvertently by tribo-electric exchanges during handling can equally create electric fields that cause image change. This effect poses a threat to image retention and stability. It should be emphasized that this significant problem is a threat to any electric reusable paper technology which uses field-addressed electric reusable paper sheets including Gyricon, liquid crystal and electrophoretic technologies.

A fourth issue facing the use of external addressing devices on electric reusable paper sheets is that one-dimensional external addressing devices are limited in how quickly they can print an image on an entire sheet by the response speed of optical display elements. In Electric reusable paper substrates, complete rotation of bichromal elements is only achieved if the addressing electric field is held at least as long as the required rotation time, on the order of 100 milliseconds. For a sheet on which many rows of an image must be printed it would take many seconds or even possibly minutes to display an entire image.

A final issue facing electric reusable paper is the difficulty of producing color versions. U.S. Pat. No. 5,717,515 by Sheridon issued Feb. 10, 1998 and titled "Canted Electric Fields For Addressing A Twisting Ball Display" describes several methods for making highlight color and full color versions of a electric reusable paper substrate and display. These systems all require multi-segmented spheres instead of bichromal spheres. That is, the rotational elements needed to implement a color system have at least three different segments instead of the two segments used in the bichromal spheres. While production of multi-segmented spheres is possible the fabrication techniques needed are more complex and therefor the multi-segmented spheres are more difficult to manufacture than bichromal spheres. Additionally, these implementations use the complex addressing techniques of canted fields, multithreshold multipass addressing or addressing requiring multiple electrode addressing layers. Canted field addressing requires the generation of electric fields that are not substantially perpendicular to the viewing surface while multithreshold multipass addressing requires the usage of spherical elements which rotate when different strengths of electric fields are applied. In short, all of these systems are more complex and more difficult to implement than typical gyricons using bichromal rotational elements.

One proposed solution to the above problems has been to use charge retaining island patterning on the electric reusable paper sheets. This technique has been described in copending U.S. patent application Ser. No. 09/037,767 by Howard et al., titled "Charge Retention Islands For Electric Paper And Applications Thereof", incorporated by reference hereinabove.

In summary, charge retaining island patterning is an electric reusable paper sheet that uses a pattern of conductive charge-retaining islands on the outward-facing side of at least one of two opposed outward surfaces. The second outward surface may also be coated with a conductive material, or made of a conductive material, and may or may not be patterned. The charge-retaining islands of the patterned surface or surfaces receive electric charges from an external charge-transfer device. The external charge-transfer device could have a plate configuration and be held over and in contact with the sheet, it could have a wand configuration and be pulled across the sheet, or it could have a stylus configuration and be used like a pen or pencil. After the charge-transfer device is removed, the conductive, charge-retaining islands hold electric charge, creating an electric field in the electric reusable paper of sufficient magnitude and duration to cause an image change.

Unfortunately, as useful as the charge retaining island approach has been in mitigating the above problems, it can introduce a new image stability issue because the charge retaining islands retain charge for a some period of time after they have been addressed and the image has changed in the electric reusable paper sheet. This instability arises because fully charged islands on an electric reusable paper sheet can easily have charge removed by contact with a grounded device, such as a person's finger. Rapid charge removal of the charge on the charge retaining islands, such as when immediately handled subsequent to addressing, can cause some rotational elements to rotate and create image defects such as streaks or fingerprints, due to the return-to-zero effects outlined earlier.

However, an alternate embodiment of the charge retaining island approach does not suffer from the above instability. The alternate embodiment utilizes charge retaining islands which are created as part of the bulk of the encapsulating layer instead of being patterned on the surface of the layer. Extending the conductivity of the charge retaining islands through the bulk of the encapsulating layer to the sheet contained therein improves the performance of the charge retaining islands and reduces the problem of image instability when handled immediately after addressing. This embodiment is implemented using a z-axis only conductive sheet material. Z-axis only sheet materials are generally made from an insulating host material which has been doped with conductive particles that transmit charge only in one axis. While this approach has been somewhat successful, it can suffer from the defect that constructing charge retaining islands with z-axis properties of any significant size is difficult. If the islands are too small and are too widely placed, not enough electric field is generated to accomplish element rotation and reliably addressing the charge retaining islands becomes difficult. Furthermore, construction of charge retaining islands of sufficient size may result in image degradation of the sheet because the conductive material used to dope the sheet may degrade the optical properties of the sheet.

SUMMARY OF THE INVENTION

An electric reusable paper substrate is provided with a charge retaining island structure on at least one surface. The charge retaining island structure is formed on a layer comprised of conductive portions separated by non-conductive portions. An island should be in contact with at least one conductive portion, however conductive portions should not be in contact with more than one island.

While the present invention will be described in connection with a preferred embodiment and method of use, it will be understood that it is not intended to limit the invention to that embodiment and procedure. On the contrary, it is intended to cover all alternatives, modifications and equivalents as may be included within the spirit and scope of the invention as defined by the appended claims.

DETAILED DESCRIPTION OF THE INVENTION

Figure 1:
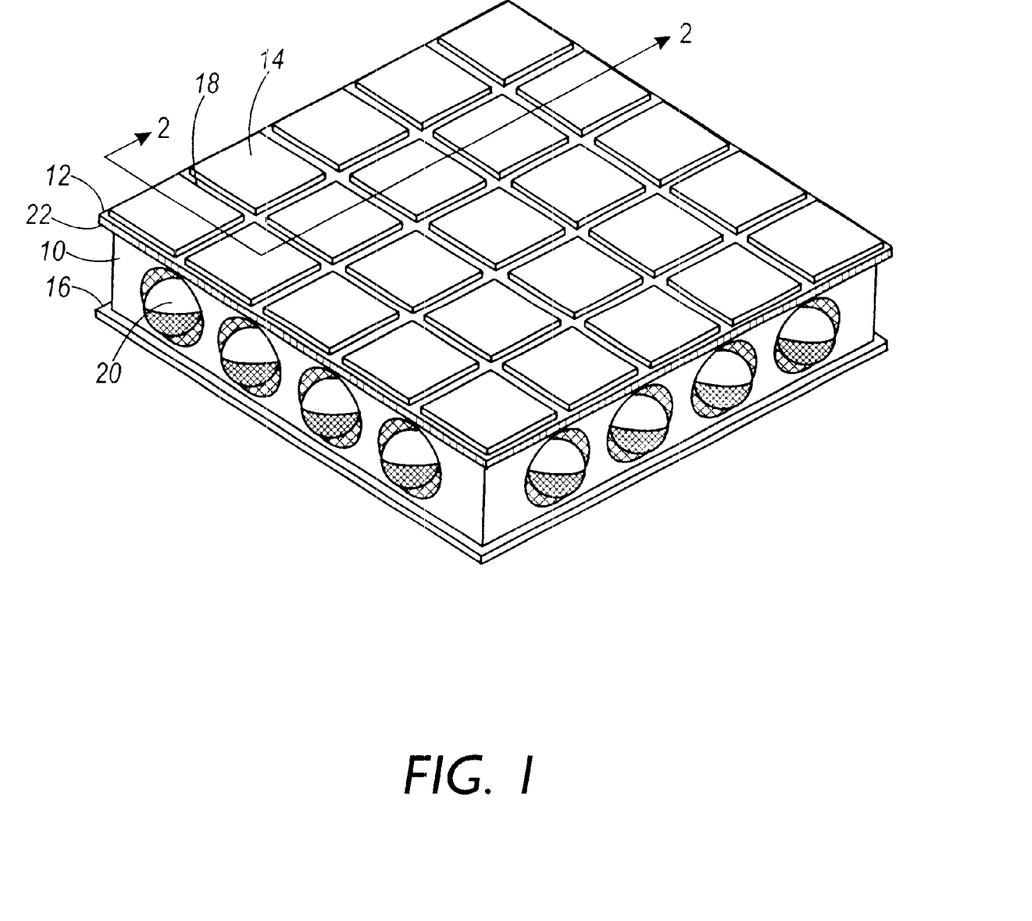
FIG. 1 shows a perspective view of an electric reusable paper sheet, according to the present invention.

Turning now to FIG. 1 an electric reusable paper sheet, according to the present invention, is shown. The electric reusable paper sheet is comprised of the following elements: a electric reusable paper substrate such as a gyricon sheet 10 which contains bichromal elements 20, a first encapsulating layer 12 patterned with conductive charge-retaining islands 14, and a second encapsulating layer 16 that may or may not be patterned with charge-retaining islands. Although the bichromal elements 20 of the 10 are pictured here as substantially spherical, it should be noted that other configurations are also possible. In particular, bichromal elements that are substantially cylindrically shaped are also known. A complete discussion of twisting cylinder electric reusable paper substrates, their use and manufacture can be found in U.S. Pat. No. 5,894,367 issued Apr. 13, 1999, titled "Twisting Cylinder Display Using Multiple Chromatic Values" by Sheridon, and copending U.S. patent application Ser. No. 08/716,672 filed Sep. 13, 1996, titled "Twisting Cylinder Display" by Crowley and Sheridon, incorporated by reference hereinabove.

Together, the first encapsulating layer 12 and the second encapsulating layer 16 must do the following things: indefinitely contain a electric reusable paper substrate 10, provide at least one transparent window through which the electric reusable paper substrate 10 can be viewed, and provide at least one external surface patterned with charge retaining islands 16 that can be addressed with an external charge transfer device. The first encapsulating layer 12 and second encapsulating layer 16 could take the form of thin plastic sheets that are sealed or fastened around the perimeter of the electric reusable paper substrate 10. The second encapsulating layer 16 need not be entirely separate from the first encapsulating layer 12. The second encapsulating layer 16 could simply be an extension of the first encapsulating layer 12, folded over and around the edge of the sheet and then sealed or fastened around the remaining perimeter. The first encapsulating layer 12 and second encapsulating layer 16 could also take the form of a coating, applied by spraying, doctoring, or some other method to hold the contents of the electric reusable paper substrate 10.

FIG. 1 shows a pattern for the charge retaining islands 14 of the outer surface of the first encapsulating layer 12. The charge-retaining islands 14 have square perimeters and are organized in a simple two-dimensional x-y matrix. Narrow channels 18 of encapsulating layer 12 material separate the charge-retaining islands 14. The channels 18 serve to isolate the charge-retaining islands 14, preventing migration of charge laterally across the encapsulating sheet, and should be small with respect to the charge-retaining islands 14, so that the maximum possible area of the display is covered with conductive charge-retaining material. The channels 18 must not become so small, though, that they fail to prevent significant charge leakage across the charge-retaining islands 14. Even if island-channel proportions are properly designed, in practice, dirt and accumulated debris can provide conduction paths across channels. Therefore, it is important to keep the surface of the patterned encapsulating layers clean.

It should be noted that the charge retention islands need not be implemented in a regular two-dimensional pattern utilizing an x-y matrix. Other patterns are possible including a charge-retaining island pattern that utilizes a random array. When using other patterns, it is important that the charge retaining islands 14 be relatively large compared to the channels 18. In a random distribution, both feature sizes must be much smaller than the pixel size of a displayed image. Pixel size is determined by the size or range of addressing elements of an external charge transfer device independently of the size of the charge retaining islands 14. The charging array need not be registered or aligned perfectly with the pattern, though, because large groups of islands are charged by each addressing element and moire' effects are negated by the randomness of the island pattern.

The second encapsulating layer 16 may be conductive, but not patterned with charge retaining islands. The second encapsulating layer 16 can be made conductive by being made of conductive material or coated with conductive material on either its inner or outer surface. Thus the second encapsulating layer 16 is laterally conductive across at least one of its entire surfaces. In this form, the second encapsulating layer 16 can serve not only as an equipotential surface, but as a very effective tribo-shielding layer that provides protection from inadvertent tribo-writing.

The second encapsulating layer 16 may also be patterned using either an organized array of charge retaining islands or a random array of charge retaining islands such as shown for the first encapsulating layer. For the best performance, such a pattern would have to face outward from the sheet and be addressed by a second external charge transfer device while a first charge transfer device addresses the pattern on the first encapsulating.

Other patterns for the second encapsulating layer 16 are also possible. In particular, the patterning of the second encapsulation layer can be arranged to have non-adjacent segments electrically connected together. In this manner non-contiguous regions can be simultaneously selected to be addressed by the charge transfer device on the first encapsulating layer 12 while preventing addressing of those regions not selected.

The second encapsulating layer 16 can also be implemented without any conductive properties. However, a non-conductive second encapsulating layer would only serve to contain the sheet. It would not provide any protection from inadvertent tribo-writing. When using a non-conductive second encapsulating layer, an external electrically grounded back plane (not shown) must be used, such as an adjacent grounded metal plate, for the best writing performance.

The electric reusable paper substrate 10 can be constructed by techniques already known in the art. The charge retaining islands 14 can be created on or in the encapsulating layer 12 by many means with any suitably conductive material. One technique creates islands of conductive and transparent Indium Tin Oxide (ITO) on a z-axis only conductive film. Z-axis conductive films are known and generally consist of a matrix loaded with conductive particles, such as silver coated glass beads, to allow for an electrically conductive interconnection through the films thickness. However, the conductive particles are spaced far enough apart to be electrically insulative in the plane of the film. The z-axis only conductive film is coated with a very thin layer of ITO, and then channels are etched in the ITO by photolithographic processes well known in the art. The remaining conductive ITO regions act as charge retaining islands, while the channels 18 are created by the underlying z-axis only conductive film. Any conductive material such as chrome, aluminum, polyaniline which can applied to form discontinuous conductive regions could be used in place of the ITO. Many z-axis only conductive materials, such as those made by 3M Corporation of St. Paul, Minneapolis, Fuji Poly of Kenilworth, N.J., or Shin-Etsu Polymer Company, Limited of Japan, are possible candidates for a substrate on which to build the islands.

Figure 2:
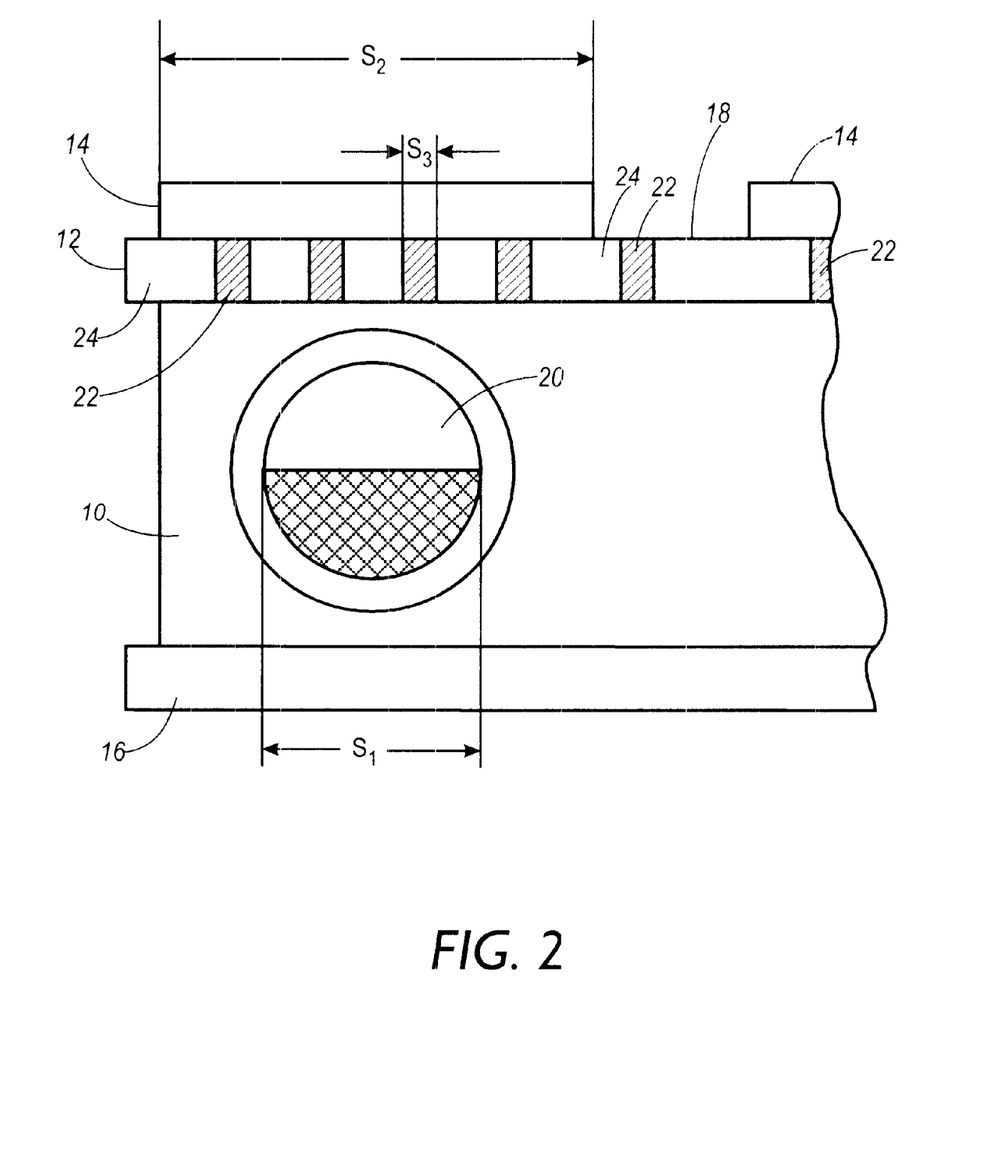
FIG. 2 shows an enlarged cross-sectional view of an electric reusable paper sheet according to the present invention.

FIG. 2 shows an enlarged cross-sectional view of the electric reusable paper sheet shown in FIG. 1 taken through cross-section line 2—2. As can be seen in FIG. 2, the encapsulating layer 12 is clearly comprised of alternating conductive regions 22 and non-conductive regions 24. The rotational element 20, the charge retaining island 14, and the conductive regions 22 each have a size s1, s2, and s3 respectively. The size s2 of the charge retaining island 14 is shown to be on the order of the same magnitude of the size s1 of the rotational element 20. To achieve element rotation the size s2 of the charge retaining island 14 should be no smaller than ½ the size s1 of the rotational element 20. The size of the conductive region s3 however, is substantially smaller than the size s2 of the charge retaining island 14. The size of the conductive regions 22 should be kept as small as possible, but no larger than ⅓ of the size of the charge retaining island 14. The conductive regions 22 in the encapsulating layer need not be of uniform size or distribution throughout the encapsulating layer 12, however they should be small enough and distributed enough throughout the encapsulating layer 14 such that at least one conductive region 22 is associated with as many charge retaining islands 14 as possible for optimal performance. Also, the conductive regions 22 should be placed relative to the charge retaining islands 14 so that they do not bridge the channel 18 between two charge retaining islands 14. The size and distribution will vary with manufacturing techniques. For instance, if accurate placement of the conductive regions 22 can not be maintained then it may be desirable to make the conductive regions 22 much smaller than the size of the channel 18 to insure that a conductive region 22 can not bridge the channel 18 between two charge retaining islands 14 as shown in FIG. 2.

The size s3 of any single conductive region 22 is too small to effectively rotate the rotational element. However, the charge retaining island 14 in conjunction with the conductive regions 22 can together effectively be addressed and achieve rotation of the rotational element without suffering from the image instability problems associated with charge removal when an electric reusable paper sheet is handled immediately after addressing.

An external charge transfer device must also be chosen to work with a charge retaining island pattern. These are fully described in U.S. patent application Ser. No. 09/037,767, incorporated by reference herein above. However, they will be summarized below for ease of understanding. Two suitable mechanisms have been identified for transferring charge to charge retaining islands. The first is contact charging, whereby, a mechanical contact is made between conductive contact elements of an external addressing array and the conductive charge retaining islands. When in contact, charge is transferred across the interface bringing the charge retaining islands to the same electric potential as the contact elements. Charge remains on the charge retaining islands, maintaining a voltage and an electric field in the sheet, well after contact is broken and the contact elements are removed from the writing area. Ionographic technology, well known in the art, represents another possible charge transfer mechanism that does not rely on mechanical contact to the islands. Ionographic elements create a controlled flow of ions from a corona discharge source that can be directed precisely to spots on a nearby surface, such as the charge retaining islands of the present invention.

Various mechanical arrangements have been envisioned for external charge transfer devices that utilize either of the above charge transfer mechanisms. These are more fully discussed in copending U.S. patent application Ser. No. 09/037,767 incorporated by reference hereinabove. One of these is a single element stylus which can be utilized like a pen or pencil. The stylus, which uses a contact transfer mechanism has a soft, conductive tip which is used to make contact with charge retaining islands. A single element ionographic stylus is also plausible.

Alternatively, a one-dimensional array of charge transfer elements could also be built and used like a print head or wand. The contact charging wand is comprised of alternating conductive charge transfer elements and insulating elements.

Thirdly, a two-dimensional array of addressing elements is envisioned that addresses entire sheets of electric reusable paper. A two dimensional array such as this is called a charge transfer platen. A sheet of electric reusable paper is temporarily positioned inside the charge transfer platen which has a supporting base and a two-dimensional matrix addressing array of addressing elements. Charge is then transferred to all the charge retaining islands simultaneously, an image is created, and the electric reusable paper can be removed. Further, hybrid plate-wand configurations are also conceivable which might provide a compromise between cost and performance provided by the two approaches.

Figure 3:
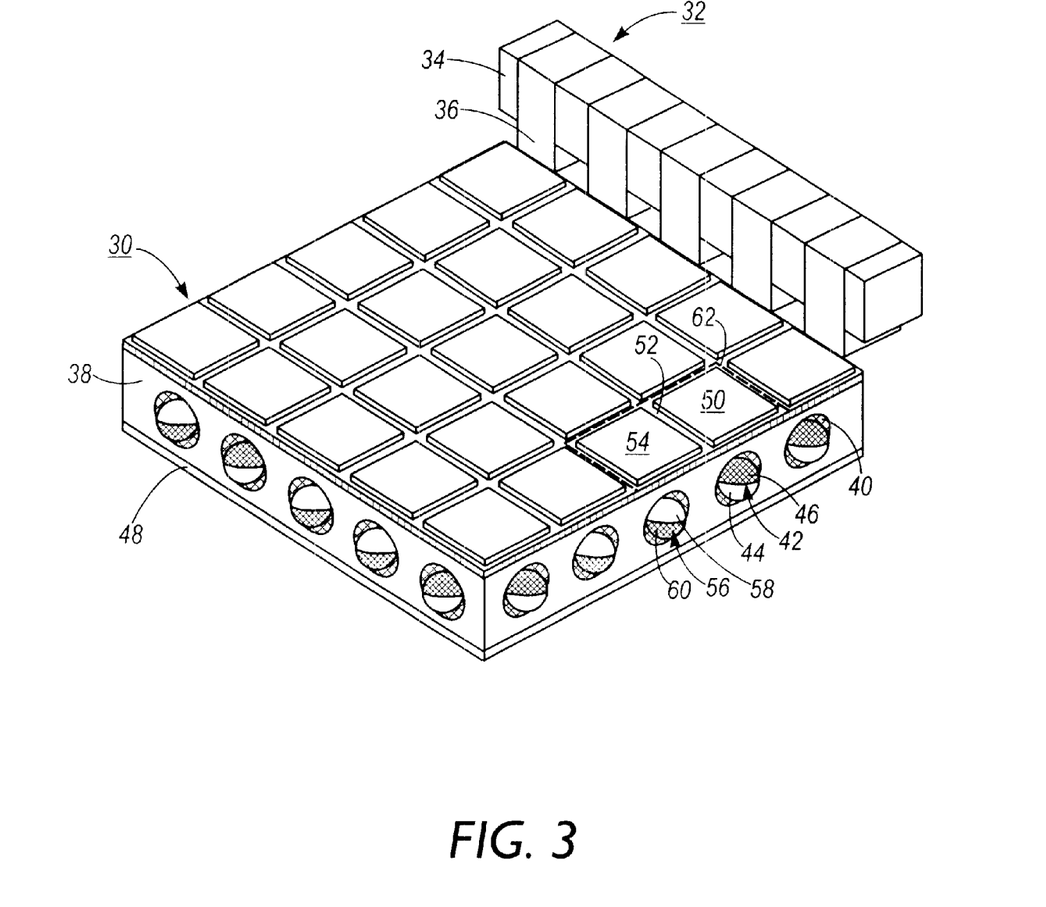
FIG. 3 is an electric reusable paper sheet illustrating a pixel with two subpixels.

The charge retaining islands technique, described above, can also be used to implement a gyricon with grey scales, highlight color, additive full color, or custom colors using only simple bichromal elements. FIG. 3 shows a portion of a electric reusable paper sheet 30 with an arrayed charge transfer device 32 containing alternating portions of a insulating element 34 and a charge transfer element 36. The electric reusable paper substrate 30 comprises a electric reusable paper substrate, such as gyricon sheet 38 with fluid filled cavities 40, wherein each cavity contains a bichromal element such as bichromal element 42 which is divided into two different portions 44, 46, each portion having an optical characteristic. One surface of the electric reusable paper sheet 30 is covered with a conductive material 48 to provide an equipotential surface while the other surface of the electric reusable paper sheet 30 is covered with an array of charge retaining islands 50, 54 separated by channels 52. It should be noted that this particular configuration is used for illustrative purposes only and the foregoing described variations in charge transfer devices and construction of charge retaining islands and equipotential surface are also applicable. Also, while FIG. 3 shows only one bichromal element associated with each charge retaining island in practice it would be more likely that many bichromal elements would be associated with a given charge retaining island. In such instances, the bichromal elements can be arranged in any pattern such as close packed array or a random distribution as is already known in the art. Furthermore, while the bichromal elements are shown as bichromal spheres in this drawing, they need not be spheres but might also be bichromal cylinders as described in U.S. patent application Ser. No. 08/716,672 by Sheridon et al., filed Sep. 13, 1996, assigned to the same assignee and herein incorporated by reference.

To implement a pixel addressable electric reusable paper sheet with improved grey scale, a pixel 62 would contain an area associated with at least two charge retaining islands 50, 54. Although only two charge retaining islands 50, 54 are shown as belonging to pixel area 62 it is feasible that a given pixel area might include many charge retaining islands. Each charge retaining island 50, 54 is likewise associated with a bichromal element 42, 56 and defines a separately addressable subpixel area of pixel 62 which can be addressed by the charge transfer device 32.

If the two different portions 44, 46 of bichromal element 42 have the optical characteristics of white and black, respectively, and the two different portions 58, 60 of bichromal element 56 have the optical characteristics of white and black, respectively, then pixel 62 can be used to display three grey scale values by selecting both subpixels to be white, one subpixel to be white while the other is black, or both subpixels to be black. By extension, using many pixels together, the gyricon can display a wider range of grey scale values by selecting a combination of pixels where each pixel displays one of the three values described above.

Figure 4:
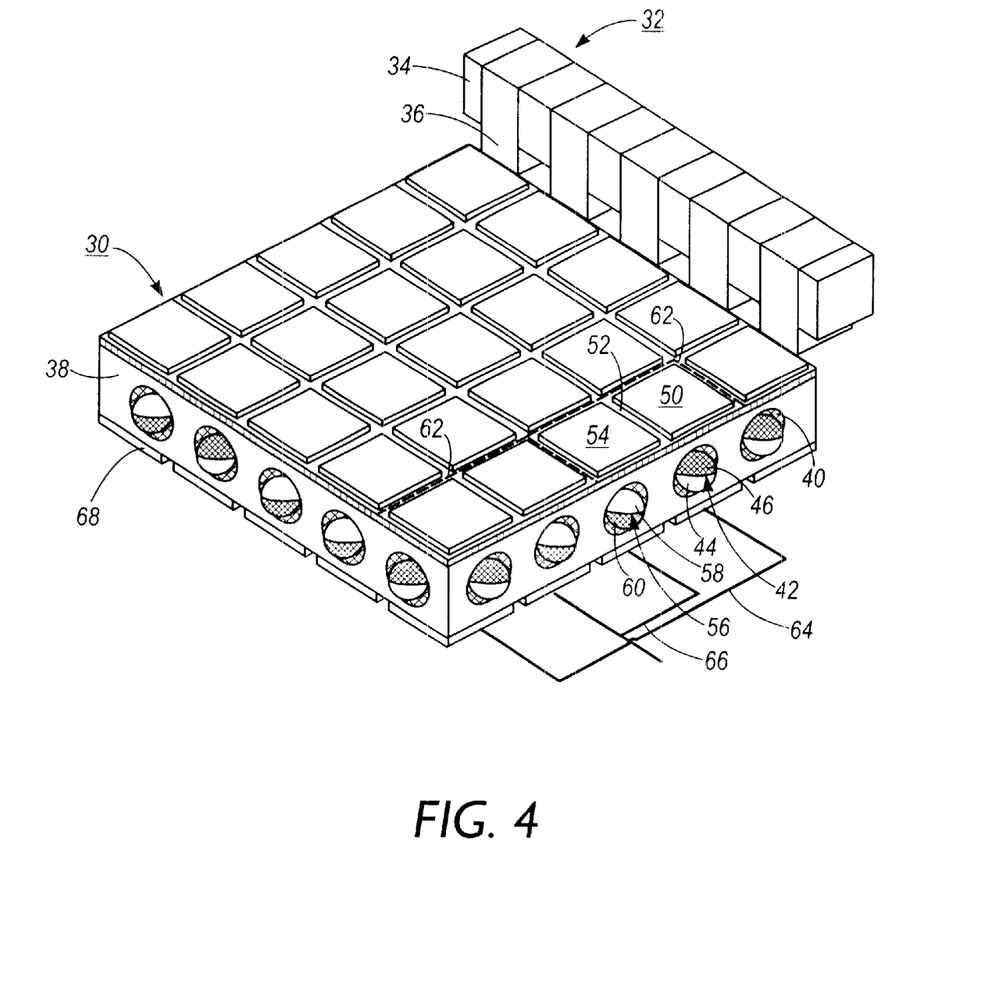
FIG. 4 is an electric reusable paper sheet illustrating a method of subpixel selection.

To make addressing of subpixels easier what was the equipotential surface 48 in FIG. 3 can be patterned into an island structure 68 as shown in FIG. 4. If the equipotential surface 48 is replaced with an island structure 68 then the regions associated with particular subpixels can be electrically tied together by electrical lines 64, 66. Providing the appropriate electrical potential on electrical lines 64, 66 allows for simultaneous selection of particular subpixels to be addressed by the charge transfer device while preventing addressing of other subpixels.

Grey scale implementation however is not limited to the example above, for instance if the two different portions 44, 46 of bichromal element 42 have the optical characteristics of white and black, respectively, and the two different portions 58, 60 of bichromal element 56 have the optical characteristics of white and some intermediate value of grey, respectively, then pixel can be used to display 4 grey scale values by selecting both subpixels to be white, one subpixel to be white while the other is either black or grey, or one subpixel to be grey while the other subpixel is black. By extension, using many pixels together, the gyricon can display a wider range of grey scale values by selecting a combination of pixels where each pixel displays one of the four values described above. However, this implementation may result in some loss of saturation for black as both subpixels can not be selected for black.

Conversely, if the two different portions 44, 46 of bichromal element 42 have the optical characteristics of black and some intermediate value of grey, respectively, then pixel 62 can also be used to display 4 grey scale values, however, this implementation may result in some loss of brightness as both subpixels can not be selected for white. This approach can also be extrapolated to many combinations of subpixels wherein each subpixel contains some combination of black, white, and intermediate grey values.

This approach is also extendible to provide highlight color. For instance if the two different portions of 44, 46 bichromal element 42 have the optical characteristics of white and black, respectively, and the two different portions 58, 60 of bichromal element 56 have the optical characteristics of white and some other color, for instance red, respectively, then pixel 62 can be used to display 4 color values by selecting both subpixels to be white, one subpixel to be white while the other is either black or red, or one subpixel to be red while the other subpixel is black. This would allow for instance the display of red text or red underline.

Highlight color could also be used in dedicated areas of the electric reusable paper sheet. For instance, the pixel 62 might be located in an area of the sheet where a company logo is expected to be displayed. In such a case the two different portions 44, 46 of bichromal element 42 and the two different portions 58, 60 of bichromal element 56 have the optical characteristics of the colors of the company logo. Taking as an example, the "red digital X" displayed on a white background used by Xerox Corporation, the two different portions 44, 46 of bichromal element 42 have the optical characteristics of white and red, respectively, and the two different portions 58, 60 of bichromal element 56 are also colored with white and red, respectively. In this case, the pixels in that portion of the electric reusable paper sheet 30 containing the red and white coloration could be used to display the "red digital X" on a white background while the remainder of the electric reusable paper sheet can be used to display black and white text.

Figure 5:
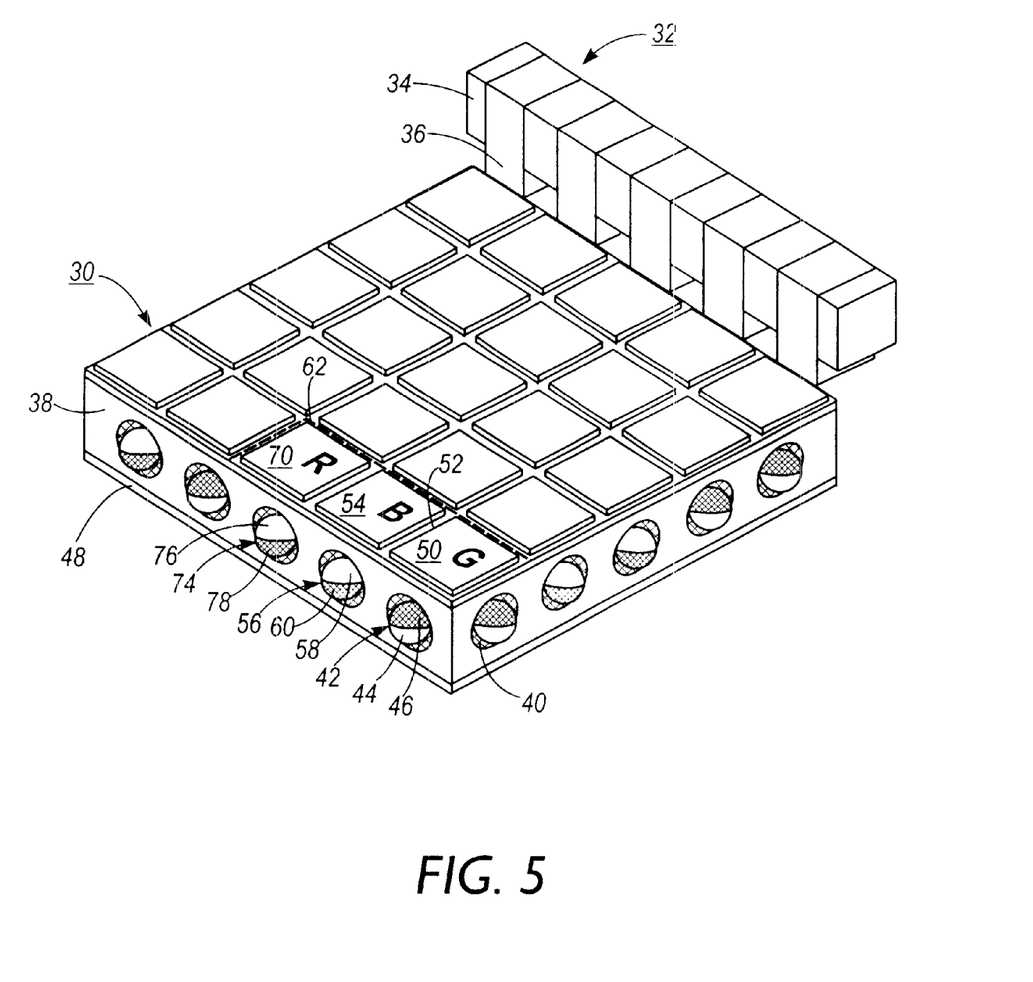
FIG. 5 is an electric reusable paper sheet illustrating a pixel with three subpixels.

The charge retaining islands technique can also be used to implement an additive full color gyricon using only simple bichromal elements. FIG. 5 shows a portion of an electric reusable paper sheet 30 with an arrayed charge transfer device 32 containing alternating portions of a insulating element 34 and a transfer element 36 as described earlier. The electric reusable paper sheet 30 comprises an electric reusable paper substrate 38, such as a gyricon sheet with fluid filled cavities 40, wherein each cavity contains a bichromal element such as bichromal element 42 which is divided into two different portions 44, 46. One surface of the electric reusable paper sheet 30 is covered with a conductive material 48 to provide an equipotential surface while the other surface of the electric reusable paper sheet 30 is covered with an array of charge retaining islands 50, 54 separated by dielectric channels 52. It should be noted that this particular configuration is used for illustrative purposes only and the foregoing described variations in charge transfer devices and construction of charge retaining islands and equipotential surface are also applicable. Also, while FIG. 5 shows only one bichromal element associated with each charge retaining island, in practice it would be more likely that many bichromal elements would be associated with a given charge retaining island. In such instances, the bichromal elements can be arranged in any pattern such as close packed array or a random distribution. Furthermore, while the bichromal element are shown as bichromal spheres in this drawing, they need not be spheres but might also be bichromal cylinders.

To implement a pixel addressable gyricon with additive full color, analagous to a TV display or an LCD display a pixel 62 would contain an area associated with at least three charge retaining islands 50, 54, 70. Although only three charge retaining islands 50, 54, 70 are shown as belonging to pixel area 62 it is feasible that a given pixel area might include many charge retaining islands. Each charge retaining island 50, 54, 70 is likewise associated with a bichromal element 42, 56, 74 respectively and defines a separately addressable subpixel area of pixel 62 which can be addressed by the charge transfer device 32.

If the two different portions 44, 46 of bichromal element 42 have the optical characteristics of white and green, respectively, the two different portions 58, 60 of bichromal element 56 have the optical characteristics of white and blue, respectively, and the two different portions, 76, 78 of bichromal element 74 have the optical characteristics of white and red, respectively then pixel 62 can be used to display additive full color images. Just as in a TV display or an LCD display specific colors are chosen by selecting different portions of pixel 62. For instance, if a red pixel is desired, then bichromal element 74 will be positioned by the charge transfer device to show it's red portion while bichromal elements 56 and 42 will be positioned to show their white portions. Similarly, if a green pixel is desired, then bichromal element 42 will be positioned by the charge transfer device to show it's green portion while bichromal elements 56 and 74 will be positioned to show their white portions. The gyricon can then display a wide range of colors by using many pixels together and selecting a combination of pixels where each pixel displays either red, blue, green, or white. However, the disadvantage to this arrangement is that black is not available.

The gyricon system can be used to display additive full color and black by using a different selection of bichromal elements. To implement a pixel addressable electric reusable paper with additive full color plus black the two different portions 44, 46 of bichromal element 42 have the optical characteristics of black and green, respectively, the two different portions 58, 60 of bichromal element 56 have the optical characteristics of black and blue, respectively, and the two different portions, 76, 78 of bichromal element 74 have the optical characteristics of black and red, respectively. Just as in a TV display or an LCD display specific colors are chosen by selecting different portions of pixel 62. For instance, if a red pixel is desired, then bichromal element 74 will be positioned by the charge transfer device to show its red portion while bichromal elements 56 and 42 will be positioned to show their black portions. Similarly, if a green pixel is desired, then bichromal element 42 will be positioned by the charge transfer device to show its green portion while bichromal elements 56 and 74 will be positioned to show their black portions. If a white pixel is desired, then bichromal element 42 will be positioned by the charge transfer device to show it's green portion while bichromal elements 56 and 74 will be positioned to show their blue and red portions, respectively. If a black pixel is desired then all three bichromal elements 42, 56, 74 are positioned to show their black portions. This configuration has the advantage of displaying a full range of colors plus black, however, it has the disadvantage of providing a less bright white as compared to the configuration described above.

To make addressing of subpixels easier the equipotential surface 48 can be patterned as previously discussed with respect to FIG. 4. If the equipotential surface 48 is also patterned then the regions associated with particular subpixels can be electrically tied together by electrical lines. Providing the appropriate electrical potential on the electrical lines allows for simultaneous selection of particular subpixels to be addressed by the charge transfer device while preventing addressing of other subpixels. For instance, all the subpixel regions associated with a particular color, for instance red, can be tied together.

Figure 6:
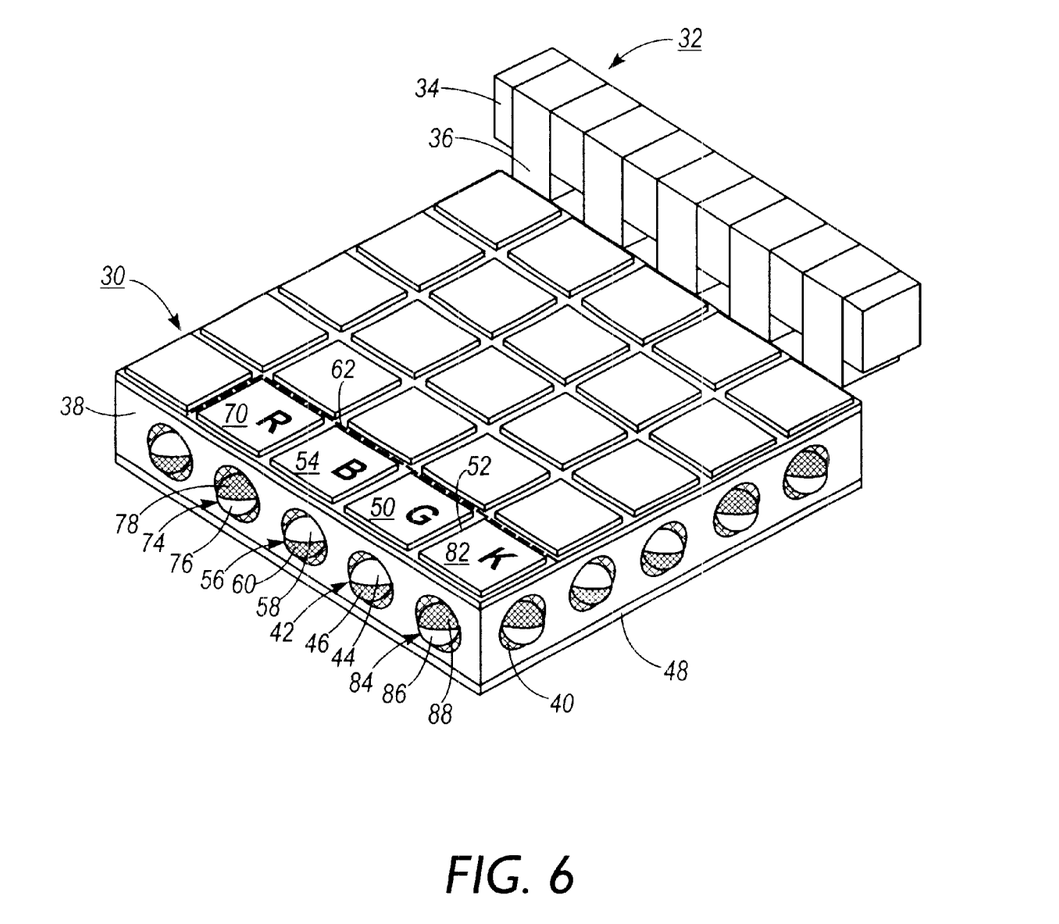
FIG. 6 is an electric reusable paper sheet illustrating a pixel with four subpixels.

A full color additive system can be configured with both a reasonably bright white and black as shown in FIG. 6. FIG. 6 shows a portion of an electric reusable paper on sheet 30 with an arrayed charge transfer device 32 containing alternating portions of a insulating element 34 and a transfer element 36 as described earlier. The electric reusable paper sheet 30 comprises an 38, such as a gyricon sheet with fluid filled cavities 40, wherein each cavity contains a bichromal element such as bichromal element 42 which is divided into two different portions 44, 46. One surface of the electric reusable paper sheet 30 is covered with a conductive material 48 to provide an equipotential surface while the other surface of the electric reusable paper sheet 30 is covered with an array of charge retaining islands 50, 54 separated by dielectric channels 52. It should be noted that this particular configuration is used for illustrative purposes only and the foregoing described variations in charge transfer devices and construction of charge retaining islands and equipotential surface are also applicable. Also, while FIG. 6 shows only one bichromal element associated with each charge retaining island, in practice it would be more likely that many bichromal elements would be associated with a given charge retaining island. In such instances, the bichromal elements can be arranged in any pattern such as close packed array or a random distribution. Furthermore, while the bichromal elements 42 are shown as bichromal spheres in this drawing, they need not be spheres but might also be bichromal cylinders.

In this implementation a pixel 62 would contain an area associated with at least four charge retaining islands 50, 54, 70, 80. Although only four charge retaining islands 50, 54, 70, 80 are shown as belonging to pixel area 62 it is feasible that a given pixel area might include many charge retaining islands. Each charge retaining island 50, 54, 70, 82 is likewise associated with a bichromal element 42, 56, 74, 84 respectively and defines a separately addressable subpixel area of pixel 62 which can be addressed by the charge transfer device 32.

One portion 44, 58, 76, 86 of each of the bichromal elements 42, 56, 74, 84 is colored white and the other portion 46, 60, 78, 88 of each of the bichromal elements 42, 56, 74, 84 is colored green, blue, red, and black respectively. Specific colors are again chosen by selecting different portions of pixel 62. For instance, if a red pixel is desired, then bichromal element 74 will be positioned by the charge transfer device to show it's red portion while the remaining bichromal elements 54, 42, and 84 will be positioned to show their white portions. Similarly, if a green pixel is desired, then bichromal element 42 will be positioned by the charge transfer device to show it's green portion while the remaining bichromal elements 56, 74, and 84 will be positioned to show their white portions. The gyricon can then display a wide range of colors by using many pixels together and selecting a combination of pixels where each pixel displays either red, blue, green, black or white. Black can be selected in a similar manner by bichromal element 84 to show its black portion while the remaining elements 42, 56, and 74 can be rotated to show their white portions. White can be selected by rotating all four bichromal elements 42, 56, 74, and 84 to show their white portions. While this arrangement has the advantage of providing both black and a good bright white over the previous configurations, however it has the possible disadvantage of providing less color saturation than those configurations due to the extra subpixel used.

Figure 7:
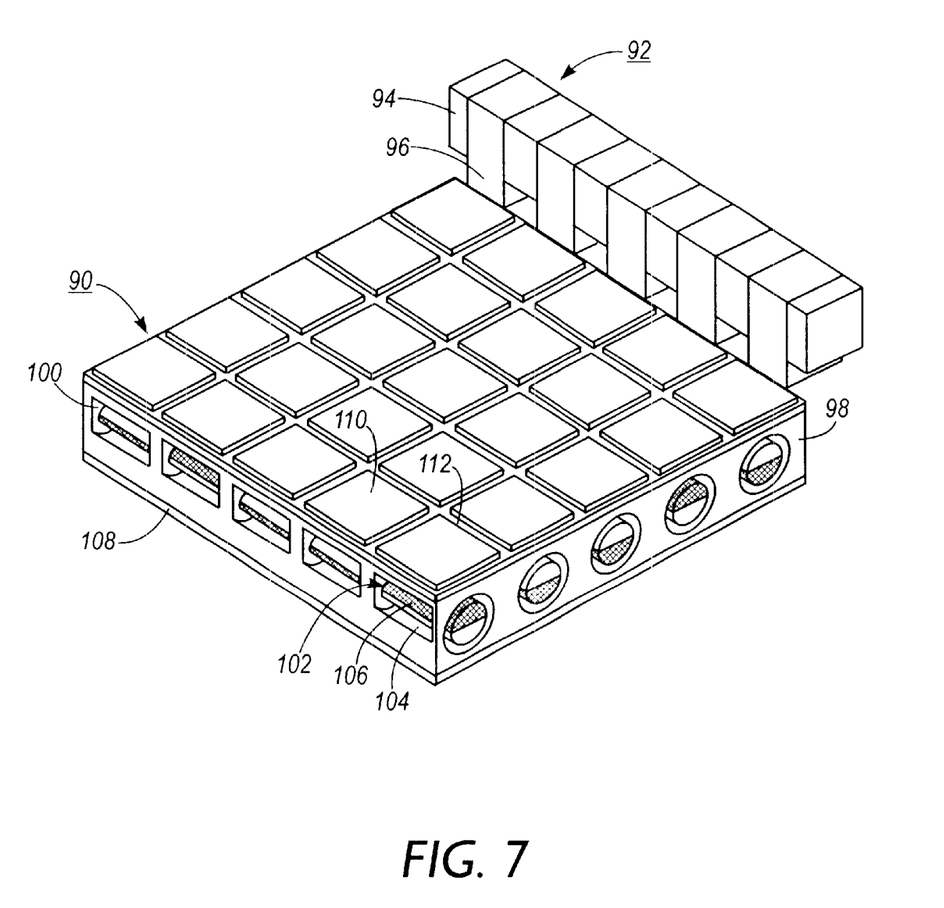
FIG. 7 is an alternative embodiment of an electric reusable paper sheet.

Any of the systems described above can be implemented with cylindrical elements for the bichromal rotational elements as shown in FIG. 7. FIG. 7 shows a portion of a electric reusable paper sheet 90 with an arrayed charge transfer device 92 containing alternating portions of a insulating element 94 and a transfer element 96 as described earlier. The gyricon sheet electric reusable paper comprises an electric reusable paper substrate 98 with fluid filled cavities 100, wherein each cavity contains a bichromal element such as bichromal element 102 which is divided into two different portions 104, 106. One surface of the electric reusable paper substrate 90 is covered with a conductive material 108 to provide an equipotential surface while the other surface of the electric reusable paper substrate 116 is covered with an array of charge retaining islands 110 separated by dielectric channels 112. It should be noted that this particular configuration is used for illustrative purposes only and the foregoing described variations in charge transfer devices and construction of charge retaining islands and equipotential surface are also applicable. Also, while FIG. 7 shows only one bichromal element associated with each charge retaining island, in practice it would be more likely that many bichromal elements would be associated with a given charge retaining island. A gyricon constructed as above could be used in any of the implementations shown in FIGS. 3–6. Selection of subpixel areas and operation would be identical, however the substitution of cylindrical particles should result in a gyricon display with better brightness and color saturation due to the higher packing densities available with cylindrical particles.

The principles described above have shown how to implement systems using the optical characteristics of color and grey scale and can be extended to any number of optical characteristics such as polarization, birefringence, phase retardation, light scattering, and light reflection. In general, the bichromal elements can be used to modulate light in a wide variety of ways.

Further, while the electric reusable paper substrate has been described with particular reference to gyricon substrates, the invention is not limited to gyricon substrate and may be used with other types of electric reusable paper substrates such as electrophoretic electric reusable paper substrates. In particular, the invention may use the Immedia substrate as produced by E-ink.

What is claimed is:

1. A material comprising an electric reusable paper sheet having two opposing outer surfaces comprising a first portion and a second portion, the second portion being an electric reusable paper substrate which extends generally contiguous with said first portion, wherein said first portion has an outer surface which forms one of the outer surfaces of the electric reusable paper sheet, wherein the outer surface is at least partially covered in a plurality of spaced apart charge retaining islands, and wherein at least one conductive region, which is in contact with a single charge retaining island, extends substantially through the first portion from the outer surface towards the second portion.

2. The material of claim 1 wherein the spaced apart charge retaining islands are arranged in a regular pattern.

3. The material of clam 1 wherein the spaced apart charge retaining islands are arranged in a random pattern.

4. The material of claim 1 wherein the spaced apart charge retaining islands are comprised of a conductive material.

5. The material of claim 4 where the conductive material is indium tin oxide.

6. The material of claim 4 where the conductive material is chrome.

7. The material of claim 4 where the conductive material is aluminum.

8. The material of claim 1 where the first portion is a z-axis only conductive material and the at least one conductive region comprises a plurality of conductive regions separated by a plurality of non-conductive regions substantially all of the conductive regions within the plurality of conductive regions are in contact with no more than 1 charge returning island.

9. The material of claim 8 wherein substantially all of the charge retaining islands are in contact with at least 1 conductive region.

10. The material of claim 9 wherein substantially all of the charge retaining islands are in contact with a plurality of conductive regions.

11. The material of claim 1 further comprising means for protection against inadvertent tribo-charge writing on the other outer surface.

12. The material of claim 9 wherein the means for protection against inadvertent tribocharge writing on the other outer surface comprises a third portion extending generally continguous with the second portion and being at least a partially laterally conductive layer.

13. The material of claim 10 wherein the at least partially laterally conductive layer comprises metal.

14. The material of claim 12 wherein the laterally conductive layer comprises a plurality of spaced apart charge retaining islands.

15. The material of claim 9 wherein the third portion has an outer surface which forms the other outer surface of the electric reusable paper sheet, wherein the outer surface is at least partially covered in a plurality of spaced apart charge retaining islands, and wherein at least one conductive region, which is in contact with a single charge retaining island, extends substantially through the first portion from the outer surface towards the second portion.

16. The material of claim 15 wherein the spaced apart charge retaining islands are arranged in a regular pattern.

17. The material of clam 15 wherein the spaced apart charge retaining islands are arranged in a random pattern.

18. The material of claim 11 where the metal is indium tin oxide.

19. The material of claim 11 where the metal is chrome.

20. The material of claim 11 where the metal is aluminum.

21. The material of claim 15 wherein the third portion is a z-axis only conductive material and the at least one conductive region comprises a plurality of conductive regions separated by where a plurality of non conductive regions substantial all of the plurality of conductive regions are in contact with no more than 1 charge returning island.

22. The material of claim 21 wherein substantially all of the charge retaining islands are in contact with at one conductive region.

23. The material of claim 21 wherein substantially all of the charge retaining islands are in contact with a plurality of conductive regions.

24. The material of claim 1 wherein the spaced apart charge retaining islands are substantially light transmissive.

25. The material of claim 1 further comprising means for transferring charge to the means for retaining an electric charge.

26. The material of claim 25 wherein the means for transferring charge comprises a contact charging device.

27. The material of claim 25 wherein the means for transferring charge comprises an ionographic charging device.

28. The material of claim 25 wherein the means for transferring charge comprises a point stylus device.

29. The material of claim 25 wherein the means for transferring charge comprises an arrayed device.

30. The material of claim 25 wherein the means for transferring charge comprises a two dimensionally array device.

31. The material of claim 1 wherein the electric reusable paper substrate comprises a substrate with a plurality of optically anisotropic elements said elements having at least two optical modulation characteristics and being constructed such that when an electric field is applied across said particles said particles will display one optical modulation characteristic which is viewable by an observer situated to observe the surface of the retaining medium.

32. The material of claim 31 wherein said elements are rotatable particles contained within dielectric filled cavities and rotate to display an optical modulation characteristic.

33. The material of claim 32 wherein the rotatable particles are substantially spherical.

34. The material of claim 32 wherein the rotatable particles are substantially cylindrical.

35. The material of claim 1 wherein at least 1 of the plurality of charge retaining islands is associated with a first set of optical characteristics and at least another of the plurality of the charge retaining islands is associated with a second set of optical characteristics.

36. The material of claim 35 a first plurality of charge retaining islands are associated with a first set of optical characteristics and a second plurality of charge retaining islands are associated with a second set of optical characteristics.

37. The material of claim 36 wherein the first plurality of charge retaining islands are electrically connected.

38. The material of claim 36 wherein the second plurality of charge retaining islands are electrically connected together.

39. The material of claim 31 wherein the electric reusable paper substrate comprises a gyricon substrate.

40. The material of claim 31 wherein the electric reusable paper substrate comprises an electrophoretic reusable paper substrate.

* * * * *